3,275,452
PREPARATION OF MEAT PRODUCTS
William M. Allen, Columbus, Ohio, assignor, by mesne assignments, to Hoover Ball and Bearing Company, Saline, Mich., a corporation of Michigan
No Drawing. Filed Apr. 17, 1963, Ser. No. 273,574
9 Claims. (Cl. 99—109)

This application is a continuation-in-part of my prior applications "Method for Manufacturing Skinless Sausages," Serial No. 769,299, filed October 24, 1958, now abandoned, and "Preparation of Meat Products," Serial No. 28,817, filed May 13, 1960, now abandoned, and includes the invention therein and improvements thereon. The present invention relates to the preparation of meat products. More particularly, it relates to the method of making meat products usually baked or cooked in packing plants, and it is especially suitable in making sausages known as skinless wieners.

The conventional method of making sausages has been to insert a comminuted meat mixture into a tubular casing, a process referred to as stuffing, and to slowly smoke and cook the sausages in a suitable enclosure. After the smoking, cooking, and cooling steps are completed, the casing is removed from the sausage. The variations in the steps of the process are quite numerous; a typical example would be as follows:

The comminuted meat mixture is stuffed into a suitable casing by use of an extrusion device, or press, having a nozzle called a stuffing horn, over which the folded casing is fitted and allowed to advance as the mixture is extruded. In this manner the meat mixture fills and carries the casing with it.

The filled casing with its end tied off is then linked by various methods, for example, by the use of a tying machine which gathers the casing at predetermined intervals along its length. Ordinarily this tying is with twine wrapped around the casing and held by friction. The linked casings are then moved to racks in a smokehouse or oven, where the product is first smoked sufficiently to give it flavor and aid its preservation. After smoking, the product is cooked coagulating the emulsion, producing an outer skin, and destroying bacteria.

The smoking step is usually about one hour in length starting at a temperature of 80 to 90° F. and increasing to 120 to 130° F. The time may be varied depending upon the flavor and color desired by the manufacturer. After the smoking period, the temperature is increased to 150° F. for about one hour followed by another increase to 175° F. for another hour. During the time at 150° F. and 175° F., the sausages are in a smoke-free atmosphere which constitutes the cooking operation.

After cooking, the sausages which are still on the racks, are subjected to a plumping treatment by exposure to steam for about five minutes. Due to the action of the steam the sausages swell and round out. The steam treatment is followed by cooling until the sausages are reduced to a temperature of about 40° F. The first reduction of temperature is sometimes accomplished under a spray of cold water. Under the spray the sausages are reduced to about 100° F. The cold water spray is followed by a prolonged refrigeration period which may last twelve hours or longer and may be varied according to the convenience of the production schedule.

After the sausages have been cooled, the casings are removed by a mechanical peeling machine. The sausages may then be packed and returned to a refrigerated area to await shipment.

The conventional process described produces a skinless sausage with a number of attributes that the public now desires in the product. Some of the most important of these attributes are flavor, color, smooth or shiny appearance, and a proper thickness of the outer layer, which is somewhat firmer than the central portion of the sausage. The Meat Inspection Department of the Bureau of Animal Industry requires, in addition, that the internal temperature of the meat during cooking shall be raised above 138° F. to kill Trichinella. This invention relates to a new process for the manufacture of skinless sausages in which the important attributes are preserved and yet the over-all time for making the product is greatly reduced from as high as sixteen hours to about one half hour.

Other meat products, such as primal cuts, hams, bacons, various sausages, and cold cuts are often prepared by conventional methods in a manner similar to that of preparing skinless sausages, except, of course, in the case of cuts such as hams and bacon, where there is no need to stuff the meat into the casing to give it the desired form. For cold cuts and sausages, however, the casing is desirable. Boneless hams and similar-type meats are sometimes forced into a more durable casing-type container also. In general then, it may be said that smoking for a period of time necessary for proper color and flavor is required, followed by a cooking period. The cooking period is usually carried out at an elevated temperature in air, although in some cold-cut type of meats it may be completed in water after smoking. Conventional cooking methods may require as long as six to fourteen hours, depending upon the meat product. For example, a boneless ham of about ten pounds may require a cooking period of fourteen hours and a cottage butt of about two pounds may require six to nine hours.

This invention comprises a method, the preferred form of which is disclosed in the following description. Although the method described and shown in detail refers with particularity to the manufacture of skinless sausages of the frankfurter variety, it is apparent that this invention should not be limited thereto. Many of the significant details of this invention may apply with equal qualification to any meat-processing operation.

In accordance with this invention there is provided a method of preparing meats which comprises preparing and mixing ingredients to make up a comminuted meat mixture, stuffing the comminuted meat mixture into a flexible tubular mold made of a semipermeable membrane, gathering the stuffed mold to make a discrete sausage formation, smoking in a smoke-laden atmosphere, immersing the meat mixture in a liquid of predetermined content having certain desirable characteristics, cooking, cooling, and stripping the mold from the finished meat mixture.

Further, in accordance with this invention, there is provided a method of preparing meats which comprises smoking the meat in a smoke-laden atmosphere, enclosing the meat in a flexible semipermeable membrane, immersing the membrane-enclosed meat in a cooking liquid containing solutes having a higher molecular concentration (i.e. a greater number of units of solute per unit volume of solvent) than the liquid within the meat so that none of the cooking liquid enters the meat, heating the cooking liquid to a cooking temperature, cooling, and stripping the membrane from the finished meat product.

It will be seen that the cooking step herein described greatly reduces the time necessary to obtain the same results by the conventional methods because of the efficiency of the cooking liquid. The use of a semipermeable membrane and a liquid containing solutes in a greater molecular concentration than the meat liquid at an elevated temperature allows water to be withdrawn from the meat to positively prevent the addition of cooking liquid to the meat. The withdrawal of water takes place by osmosis. The unbalanced or osmotic pressure arises from the tendency of molecules from the more dilute (lower molecular concentration, i.e. lesser units of solute per unit volume of solvent) solution of water in the meat to diffuse through the semipermeable membrane to the more concentrated (greater molecular concentration) solution. The preferred cooking time for frankfurters is about twelve minutes at about 170° F.; however, the time and temperature may ve varied considerably, depending upon the quantities desired in the product. The preferred cooking time for other meat products by this method depends largely upon the size of the product. When the cooking step is performed in air, the water evaporates from the meat mixture, whereas by the method of this invention the water is "drawn" or forced from the meat mixture by osmotic pressure.

Another advantage of immersing the meat mixture, which is encased in a semipermeable membrane, into a cooking liquid having the above characteristics is that the period for smoking may be reduced. It is thought that the smoke products, for example, aldehydes which are deposited on the meat, casing, or mold, are forced into the meat by dialysis. At any length, the smoking period may be shortened to as little as three to four minutes and still the flavor produced by conventional methods may be obtained. The smoking may be terminated at the end of three minutes or prolonged as long as ten minutes depending upon the coloration or flavor desired, and the smoking takes place in an atmosphere heated to a temperature in the range of 140° F.–225° F. The exact smoking temperature used is also dependent on the desired taste of the final product, the higher the smoking temperature the greater the aldehyde penetration into the meat product and thus the more "smoked" taste.

In conventional cooking methods where the smoking and cooking is accomplished in air at elevated temperatures of about 160° to 180° F., the meat products give up large amounts of natural fluids giving rise to an attendant weight loss. Although the cooking method herein described removes fluid from the meat, fluids are not removed unnecessarily and since cooking times are relatively shorter, the cooking is completed with less fluid and weight loss with most meat products.

Coloration is controlled by the length of the smoking period, the amount of protein or beef in the emulsion, or a color inducing chemical additive such as ascorbic acid, isoascorbic acid or sodium ascorbate. Also, color may be produced by the use of artificial coloring in the casing, in the meat, or by other means. Thus, the product may be made darker by increasing any of these three factors.

The selection of the cooking liquid that will function osmotically depends on a number of factors. Some of these factors include expense, flavoring by dialysis, toxicity, stability or life, corrosive effect on equipment, relative cooking speed, and stickiness or adherence to the casing or product. Polyhydroxy alcohols, such as, sorbitol, propylene glycol, and glycerin, are good cooking mediums. Sorbitol produces a good product, is non-toxic and sugar-like. Propylene-glycol and glycerine, however, are undesirable in the final product. Salts, for example, sodium chloride and calcium chloride, in solution are also good cooking mediums, some compounds tend to invade the meat by dialysis and are corrosive to many metals that might be used in the apparatus for producing the meat product. The most desirable choice of a cooking medium is a sugar solution or salt-sugar solution. Most of the sugar solutions such as sucrose, corn syrup, fructose or levulose, dextrose or glucose, lactose, maltose, or combinations thereof are very good functionally but their use may be limited in a practical sense by their expense. Considering the factors previously mentioned, a partial invert or invert sugar solution consisting, for example, of 40% inverted sugar, 27% sucrose and 33% water, functions very efficiently osmotically and does not flavor the meat appreciably. If a slightly salty taste is desired, a solution of five parts water, four parts dextrose, and one part sodium chloride, by weight imparts the desired qualities to the meat, and in the commercial use of the process of this invention this solution is preferred.

One of the determining factors in the timing of the cooking step is the temperature at which Trichinella are destroyed; this temperature has been set at 138° F. by the Bureau of Animal Industry of the U.S. Department of Agriculture. The conventional practice of the industry of meat packers is to exceed this temperature by about 17° F. or to raise the internal temperature of meat to about 155° F.

The cooking solution for frankfurters is preferably maintained at a temperature range of 160° F. to 190° F. Thus, depending upon the temperature of the cooking solution, cooking will occur in about eight minutes at 190° F. or take as long as eighteen minutes at 160° F. It will readily be seen that if the internal temperature of the meat is to be raised to 155° F., temperatures below 160° F. become impractical. In addition, the frankfurter does not have the proper coloration since temperatures below 160° F. do not provide adequate color development. One of the advantages of this process is that the over-all time for producing frankfurters is shortened; temperatures below 160° F. would extend the cooking time to such an extent that the process loses its value as a "time saver." In addition, if the process is to be the design basis of a conveyor-type sausage-producing machine, the cooking time must be kept short and within limits so that its relation to other production steps is practical for machine purposes and to provide a continuous process. A high volume machine having a conveyor of reasonable length that does not need to be stopped in the cooking solution then becomes a practical reality.

When the temperature of the cooking solution is maintained at a temperature above 190° F. for small-sized products such as frankfurters, control of time in the cooking step becomes more precise and difficult. Poor control results in partial cooking of the meat. Such meat does not conform to the requirements of having the meat cooked on the inside. In the case of some sugar solutions, decomposition of the solution begins to occur at temperatures in excess of 190° F.

Cooking primal cuts of meat or hams, bacon, bologna, etc., does not require as much control as smaller sizes of meat or meat products and the cooking time is longer for the larger portions. It is therefore possible to increase cooking solution temperatures for larger cuts of meat to from 180° F. to 210° F. The usual internal temperature must be reached of course, and cooking time depends upon the size or weight of the cut and the kind of meat.

The semipermeable membrane is formed into a casing or enclosure so that the meat is completely separated from the cooking liquid by the membrane. Cellophane or regenerated cellulose is the most readily obtainable and practical for use as a membrane or enclosure; however, other semipermeable membranes including animal membranes, such as pork intestine, can also be used. The optimum results are obtained when the thickness of the membrane is about one thousandth of an inch thick.

In comparing the process described herein to conventional cooking methods, it is understood that the method differs substantially from the baking-type method used in the smokehouse. The function of the semipermeable membrane and the cooking liquid also differs substantially from the function of other cooking solutions, such as water or salt water in the absence of the membrane. In ordinary processes, the function of the cooking medium is to conduct heat to the product to be cooked. The cooking liquid is in contact with the product to be cooked and the product receives the flavors of the cooking medium.

In contrast, in this process, the cooking medium conducts heat to a membrane which, in turn, radiates or conducts heat to the meat, and the particular cooking medium used herein, such as the preferred sugar-salt solution provides a very efficient medium for effecting this heat transfer. There is a controlled separation between the cooking medium and the meat, namely the membrane. The liquid of the meat, the membrane, and the cooking solution function as a "pump" in that a pressure differential is created. This pressure differential is due to the different molecular concentrations of the liquid in the membrane and the cooking liquid. Liquid in the membrane is a water solution normally found in the animal muscles, plus water added to the meat (in the case of wieners) and the salt added as a condiment. In the case of most wieners one hundred pounds of meat emulsion contains about fifty five pounds of water and after adding salt the emulsion is about 1.5% salt. This salt content amounts to about 3% of the liquid phase of the emulsion, and the amounts of flavorings added are in such small quantities that they can be neglected in considering the molecular concentration of the liquid in the membrane. The cooking liquid is maintained of a greater molecular concentration than this liquid in the membrane to provide the pressure differential. In the preferred solution of five parts water, four parts dextrose and one part salt by weight, it can be seen that the cooking liquid is of much greater molecular concentration than the meat liquid which is relatively dilute. This pressure differential, called osmotic pressure, "pumps" liquid from the meat so that the result is opposite that of cooking in boiling water in which water enters the meat. The meat is in the cooking solution for a relatively short time so that the water loss from the meat is seldom, if ever, more than 2%. Because of the low water loss and the shorter cooking time a coagulated or cooked tissue of a more tender structure is obtained than by conventional methods.

After smoking and cooking, the meat products are usually washed in a spray of cold water to remove cooking fluids. The product is then passed through a tank of ice water at a temperature of about 33° F. or 34° F. The cooking and cooling steps make subsequent casing stripping easier because the casing is thoroughly hydrated, i.e. wet, if stripped immediately, or because of the small amount of sugar salt solution retained by the casing it can readily be rewetted if allowed to dry, and immediate cooling also aids in the preservation of the product.

Listed in the table that follows are examples of meat products usually prepared for market in meat packing plants, and the table indicates the approximate cooking times and usual percentages of weight loss that occur with the conventional cooking and the method of this invention.

| Kind of Meat | Method of This Invention | | Conventional Methods | |
| --- | --- | --- | --- | --- |
| | Cooking Time in Hours | Percentage of Weight Loss | Cooking Time in Hours | Percentage of Weight Loss |
| Boneless Ham | 2-2½ | 10-11 | 14 | 10-11 |
| Cottage Butt | 1-1½ | 2-6 | 6-9 | 13-15 |
| Canadian Bacon | ¾-1 | ½-2 | 6-9 | 5-8 |
| Leona Sausage | 1-1½ | 2-3 | 6½ | 5-6 |
| Salami | 1½-2 | 10-12 | 9-10 | 10-12 |
| Frankfurters | 1/8-3/10 | 2 | 4-5 | 5-10 |

Most cuts of meat and types of meat are suitable for cooking by the method herein described. Excellent results have been obtained with primal cuts of meat and such meats as club sausage, rump roast, veal rump, leg of lamb, chicken, leg of veal, and ground chuck roast. Samples of the previously listed meats were prepared in accordance with the method of this invention, and corresponding samples were prepared by conventional methods; both samples were submitted to a taste panel and the taste panel could detect no difference in taste between the control samples and the samples cooked in solutions containing solutes in greater molecular concentrations than the liquid in the meats. It was noted, however, that samples prepared by this process were more tender, since there was not excessive drying at the surface as in meats prepared by smokehouse methods; also, the large cuts of membrane-encased meats that were cooked in the solution containing solutes in greater molecular concentration than the liquid in the meat were juicier since natural juices were not drained from the meats.

Typical examples of the steps involved in the preferred practice of the method herein described are as follows:

(A) The meat product is prepared by smoking and adding the desired flavorings. The meat is then enclosed in a cellophane bag, or bag made from a semipermeable membrane, and sealed. The cellophane-encased meat is then immersed in the cooking solution containing solutes in greater molecular concentration than the liquid in the meat, which solution has been elevated to a temperature of from 180 to 210° F. The meat product remains in the cooking liquid for a period of time sufficient to elevate the interior of the meat to a Trichinella-killing temperature which is also sufficient to cook the meat through. The product is removed from the cooking fluid and the enclosing semipermeable membrane may be stripped off, the product cooled, and stored. In other instances, it may be desirable to leave the semipermeable membrane in place as the packaging for the product, in which case the product is sprayed with cold water to remove residual cooking fluid, cooled to a temperature of about 40° F. and stored.

(B) The meat mixture is prepared by grinding the meat, adding the flavoring, nitrates or other chemicals, some water and thoroughly mixing the ingredients. The meat mixture is then stuffed into the casing made from a semipermeable membrane and the membrane is gathered together at spaced positions so that the stuffed casing is formed into discrete sausage formations. The sausage formations are placed in a smoke-laden atmosphere at 140° F. for a period of seven minutes, then immersed in a cooking liquid having the above characteristics which has been elevated to a temperature of about 170° F. and contains solutes in greater molecular concentration than the liquid in the membrane. The sausages remain in the cooking liquid for an approximate period of twelve minutes. As the sausages are removed from the cooking fluid, they receive a spray of cold water to remove residual cooking fluid and at the same time start the cooling process. After spraying, the product is passed through a cooling tank containing ice water, or water slightly above freezing, where it remains for approximately seven minutes, and is chilled to a temperature of about 40° F. At this point the casing, which is wet, is removed or stripped off. The sausages may then be packaged and refrigerated until shipped.

It will be understood, of course, that while the forms of the invention herein described constitute the preferred embodiments of the invention, it is not intended to herein illustrate all the ramifications of the invention. It will also be understood that the words used are words of description rather than limitation, and that various changes and arrangement of steps may be substituted without departing from the spirit or the scope of the invention herein disclosed.

I claim:

1. In a process for the manufacture of comminuted meat products, comprising a comminuted meat mixture containing some liquid stuffed into a semipermeable membrane casing gathered together at spaced positions to divide said meat mixture into at least one discrete sausage form, the step of immersing said meat mixture in a nontoxic cooking liquid containing solutes of a greater molecular concentration than the liquid in said membrane at a temperature and for a period of time sufficient to coagulate said meat mixture.

2. In a process for the manufacture of sausages comprising a comminuted meat mixture containing some liquid stuffed into a flexible, semipermeable membrane mold gathered together at spaced positions to divide said mixture into discrete sausage forms and smoked in a smoke-laden atmosphere, the step of immersing said meat mixture in a nontoxic, cooking liquid containing solutes which is of a greater molecular concentration than said liquid in said membrane at a temperature and for a period of time sufficient to raise the internal temperature of said meat mixture to at least 138° F.

3. In a process for the manufacture of comminuted meat products comprising a comminuted meat mixture containing some liquid stuffed into a semipermeable membrane casing gathered together at spaced intervals to divide said meat mixture into at least one discrete sausage form, the step of immersing said stuffed casing in a nontoxic liquid containing solutes of a greater molecular concentration than said liquid in said membrane at a temperature up to 190° F. for a period up to about eighteen minutes.

4. In a process for the manufacture of sausages comprising a comminuted meat mixture containing some liquid stuffed into flexible, semipermeable membrane mold gathered tightly together at spaced positions to divide said mixture into discrete sausage forms and smoked in a smoke-laden atmosphere, the step of immersing said meat mixture in a nontoxic liquid containing solutes which is of a greater molecular concentration than the liquid in said mold at a temperature in the range between substantially 160° F. and 190° F. for a period up to eighteen minutes.

5. A process for the manufacture of sausages from a comminuted mixture containing meat and liquid comprising: stuffing the comminuted mixture into a semipermeable membrane casing, forming said mixture into a plurality of predetermined cylindrical sausage formations, smoking in a smoke-laden atmosphere for a period of up to ten minutes at a temperature in the range of 140° F.–225° F., immersing in a nontoxic cooking liquid containing solutes of greater molecular concentration than the liquid within said casing at a temperature up to 190° F. for a period of up to eighteen minutes, cooling in ice water for about seven minutes and removing said casing from said mixture.

6. A process for the manufacture of meat products from primal cuts of meat comprising: smoking said meat in a smoke-laden atmosphere, enclosing said meat in a semipermeable membrane, immersing said meat in a sugar-salt solution of a greater molecular concentration than meat liquid in said membrane at a temperature of from 180° F. to 210° F. for a period of time sufficient to raise the internal temperature of said meat to at least 138° F., cooling said meat to a temperature of at least 40° F. and removing said semipermeable membrane.

7. A process for the manufacture of sausages from a comminuted mixture containing meat and liquid comprising: stuffing the comminuted mixture into a flexible, semipermeable membrane mold, gathering said mold tightly at spaced positions to divide said mixture into at least one discrete sausage form, smoking in a smoke-laden atmosphere, immersing in a cooking liquid containing solutes of greater molecular concentration than the liquid in said mold at a temperature and for a period of time sufficient to coagulate said mixture, cooling said at least one discrete sausage form and removing the said mold from said mixture, said cooking liquid being selected from water solutions having materials from the group consisting of sorbitol, propylene glycol, glycerin, sodium chloride, calcium chloride, sucrose, corn syrup, fructose, glucose, lactose, and maltose therein.

8. In a process for the manufacture of skinless wieners from a comminuted meat mixture containing liquid and stuffed into a semipermeable membrane, the steps of:
  (a) immersing said stuffed membrane in a cooking liquid consisting essentially of five parts water, four parts dextrose, and one part salt by weight which is of a greater molecular concentration than said liquid in the membrane,
  (b) maintaining said cooking liquid at a temperature in the range of 160° F.–190° F.;
  (c) withdrawing said stuffed membrane from said cooking liquid after said stuffed membrane has been immersed therein for a time period sufficient to coagulate said meat mixture;
  (d) cooling said stuffed membrane; and
  (e) removing said membrane from the coagulated meat mixture therein when said membrane is wet.

9. In a process for the manufacture of skinless wieners from a comminuted meat mixture containing liquid and stuffed into a semipermeable membrane, the steps of:
  (a) immersing said stuffed membrane in a cooking liquid consisting essentially of five parts water, four parts dextrose, and one part salt by weight which is of a greater molecular concentration than said liquid in the membrane;
  (b) maintaining said cooking liquid at a temperature in the range of 160° F.–190° F.; and
  (c) withdrawing said stuffed membrane from said cooking liquid after said stuffed membrane has been immersed therein for a time period sufficient to coagulate said meat mixture.

References Cited by the Examiner

UNITED STATES PATENTS

| 1,631,723 | 6/1927 | Freund | 99—109 |
| 2,834,681 | 5/1958 | Kraeger | 99—102 |

OTHER REFERENCES

Berolzheimer: "Culinary Arts Institute Encyclopedic Cook Book," 1948, pub. by Culinary Arts Institute, Chicago, page 483, article entiled Boiled New Potatoes.

"The Evening Star," Washington, D.C., Sept. 10, 1957, page A–10, article entitled Young Chemist.

A. LOUIS MONACELL, *Primary Examiner.*

HYMAN LORD, *Examiner.*